US011469624B2

(12) United States Patent
Aikawa et al.

(10) Patent No.: US 11,469,624 B2
(45) Date of Patent: Oct. 11, 2022

(54) POWER SUPPLY APPARATUS AND CONTROL METHOD THEREOF

(71) Applicant: CANON KABUSHIKI KAISHA, Tokyo (JP)

(72) Inventors: Iori Aikawa, Yokohama (JP); Katsuya Nakano, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 346 days.

(21) Appl. No.: 16/516,417

(22) Filed: Jul. 19, 2019

(65) Prior Publication Data
US 2019/0341816 A1 Nov. 7, 2019

Related U.S. Application Data

(63) Continuation of application No. PCT/JP2017/039923, filed on Nov. 6, 2017.

(30) Foreign Application Priority Data

Jan. 20, 2017 (JP) .............................. JP2017-008783

(51) Int. Cl.
H02J 50/00 (2016.01)
H02J 50/60 (2016.01)
H04B 5/00 (2006.01)

(52) U.S. Cl.
CPC ............ *H02J 50/60* (2016.02); *H04B 5/0031* (2013.01); *H04B 5/0037* (2013.01)

(58) Field of Classification Search
CPC .................... H02J 50/00; H04B 5/00
See application file for complete search history.

(56) References Cited

U.S. PATENT DOCUMENTS

2008/0272889 A1* 11/2008 Symons .................. H02J 7/025
340/10.1
2012/0040613 A1* 2/2012 Nakano .................. H02J 5/005
455/41.1
(Continued)

FOREIGN PATENT DOCUMENTS

EP 2713473 A2 4/2014
JP 2010-284006 A 12/2010
(Continued)

OTHER PUBLICATIONS

The above Foreign documents 2-7 were cited in the International Search Report of International International Search Report of the corresponding International Application No. PCT/JP2017/039923 dated Nov. 28, 2017, a copy of which is enclosed.

(Continued)

Primary Examiner — Adi Amrany
(74) Attorney, Agent, or Firm — Cowan, Liebowitz & Latman, P.C.

(57) ABSTRACT

A power supply apparatus performs control so as to perform first search processing for detecting a power reception apparatus based on at least one communication method from among a plurality of communication methods, before performing power supply to the power reception apparatus detected in the first search processing, to perform second search processing for detecting a communication apparatus other than the power reception apparatus based on at least one communication method from among the plurality of communication methods, and if a communication apparatus other than the power reception apparatus is not detected in the second search processing, to transition to a state where power supply to the power reception apparatus is possible.

18 Claims, 8 Drawing Sheets

(56) References Cited

U.S. PATENT DOCUMENTS

| | | | | |
|---|---|---|---|---|
| 2013/0062959 A1* | 3/2013 | Lee | .................... | H04B 5/0043 |
| | | | | 307/104 |
| 2014/0094116 A1* | 4/2014 | Walley | .................. | H02J 50/12 |
| | | | | 455/41.1 |
| 2014/0361738 A1* | 12/2014 | Lee | ........................ | H02J 50/80 |
| | | | | 320/108 |
| 2015/0207340 A1* | 7/2015 | McFarthing | ............ | H02J 50/10 |
| | | | | 320/108 |
| 2016/0057255 A1* | 2/2016 | Liao | .................. | G06K 7/10297 |
| | | | | 455/41.1 |
| 2016/0066185 A1* | 3/2016 | Dobyns | ................. | G06Q 20/40 |
| | | | | 726/4 |
| 2017/0025903 A1* | 1/2017 | Song | ...................... | H02J 7/025 |
| 2017/0085127 A1* | 3/2017 | Leabman | ............... | H02J 50/20 |
| 2017/0294798 A1* | 10/2017 | Yuk | ...................... | H04B 5/0037 |
| 2017/0366232 A1* | 12/2017 | Lee | ........................ | H02J 50/60 |
| 2018/0254664 A1* | 9/2018 | Tanabe | ................... | H02J 50/10 |

FOREIGN PATENT DOCUMENTS

| | | | |
|---|---|---|---|
| JP | 2013-172499 A | 9/2013 | |
| JP | 2014-222963 A | 11/2014 | |
| JP | 2015-073339 A | 4/2015 | |
| JP | 2015-536633 A | 12/2015 | |
| JP | 2016-103121 A | 6/2016 | |
| WO | 2015/018868 A1 | 2/2015 | |

OTHER PUBLICATIONS

The above patent document was cited in a European Search Report dated May 18, 2020, a copy of which is enclosed, that issued in the corresponding European Patent Application No. 17893056.6.

* cited by examiner

POWER SUPPLY APPARATUS AND CONTROL METHOD THEREOF

CROSS-REFERENCE TO RELATED APPLICATIONS

This application is a Continuation of International Patent Application No. PCT/JP2017/039923, filed Nov. 6, 2017, which claims the benefit of Japanese Patent Application No. 2017-008783, filed Jan. 20, 2017, both of which are hereby incorporated by reference herein in their entirety.

BACKGROUND OF THE INVENTION

Field of the Invention

The present invention relates to a non-contact power supply system in which power is supplied from a power supply apparatus to a power reception apparatus in a non-contact manner.

Background Art

Recent years have seen known non-contact power supply systems in which power is transmitted/received in a non-contact manner using an electromagnetic induction method, a magnetic resonance method, or the like without a power reception apparatus being connected by wire to a power supply apparatus.

Patent Document 1 describes a technique in which, when a power supply from a power supply apparatus is performed, power supply and communication are performed at the same time by superimposing communication information on a power supply carrier, and, when a power supply is not performed, only communication is performed by controlling a power to be supplied.

However, in the above Patent Document 1, when a communication apparatus other than a power reception apparatus is placed on the power supply apparatus, there is a possibility that the power supply apparatus will start power supply without being able to detect the communication apparatus, and unnecessary power is transmitted to the communication apparatus, which is not a target of power supply. Such an issue arises similarly even when power supply and communication are performed in a time division manner.

The present invention has been made in light of the above issue, and realizes a technique in which, before a power reception apparatus is detected and power supply is started, a communication apparatus other than the power reception apparatus is searched for, and thus power supply to the communication apparatus other than the power reception apparatus is prevented.

CITATION LIST

Patent Literature

PTL 1: Japanese Patent Laid-Open No. 2010-284006

SUMMARY OF INVENTION

In order to solve the aforementioned problems, the present invention provides a power supply apparatus that can supply power to a power reception apparatus in a non-contact manner, comprising: a communication unit that is capable of communicating with a power reception apparatus; and a control unit that controls power supply to a power reception apparatus, wherein the control unit performs control so as to perform first search processing for detecting a power reception apparatus based on at least one communication method from among a plurality of communication methods, before performing power supply to the power reception apparatus detected in the first search processing, to perform second search processing for detecting a communication apparatus other than the power reception apparatus based on at least one communication method from among the plurality of communication methods, and if a communication apparatus other than the power reception apparatus is not detected in the second search processing, to transition to a state where power supply to the power reception apparatus is possible.

In order to solve the aforementioned problems, the present invention provides a control method of a power supply apparatus that includes a communication unit that is capable of communicating with a power reception apparatus and a control unit that controls power supply to a power reception apparatus in a non-contact manner, the method comprising: performing control so as to perform first search processing for detecting a power reception apparatus based on at least one communication method from among a plurality of communication methods; before performing power supply to the power reception apparatus detected in the first search processing, to perform second search processing for detecting a communication apparatus other than the power reception apparatus based on at least one communication method from among the plurality of communication methods; and if a communication apparatus other than the power reception apparatus is not detected in the second search processing, to transition to a state where power supply to the power reception apparatus is possible.

In order to solve the aforementioned problems, the present invention provides a non-transitory computer-readable storage medium which stores a program for causing a power supply apparatus that includes a communication unit that is capable of communicating with a power reception apparatus and a control unit that controls power supply to a power reception apparatus in a non-contact manner, the method comprising: performing control so as to perform first search processing for detecting a power reception apparatus based on at least one communication method from among a plurality of communication methods; before performing power supply to the power reception apparatus detected in the first search processing, to perform second search processing for detecting a communication apparatus other than the power reception apparatus based on at least one communication method from among the plurality of communication methods; and if a communication apparatus other than the power reception apparatus is not detected in the second search processing, to transition to a state where power supply to the power reception apparatus is possible.

Further features of the present invention will become apparent from the following description of exemplary embodiments (with reference to the attached drawings).

BRIEF DESCRIPTION OF THE DRAWINGS

The accompanying drawings, that are incorporated in and constitute a part of the specifications, illustrate embodiments of the invention and, together with the description, serve to explain the principles of the invention.

DESCRIPTION OF THE EMBODIMENTS

Aspects for carrying out the present invention will be described below in detail. Note that embodiments to be described below are examples for realizing the present invention, and are to be amended or changed as appropriate according to the configuration of an apparatus to which the present invention is applied and various conditions, and the present invention is not limited to the embodiments below. In addition, a configuration may be adopted in which some of the embodiments to be described later are combined as appropriate.

System Configuration

Figure 1:
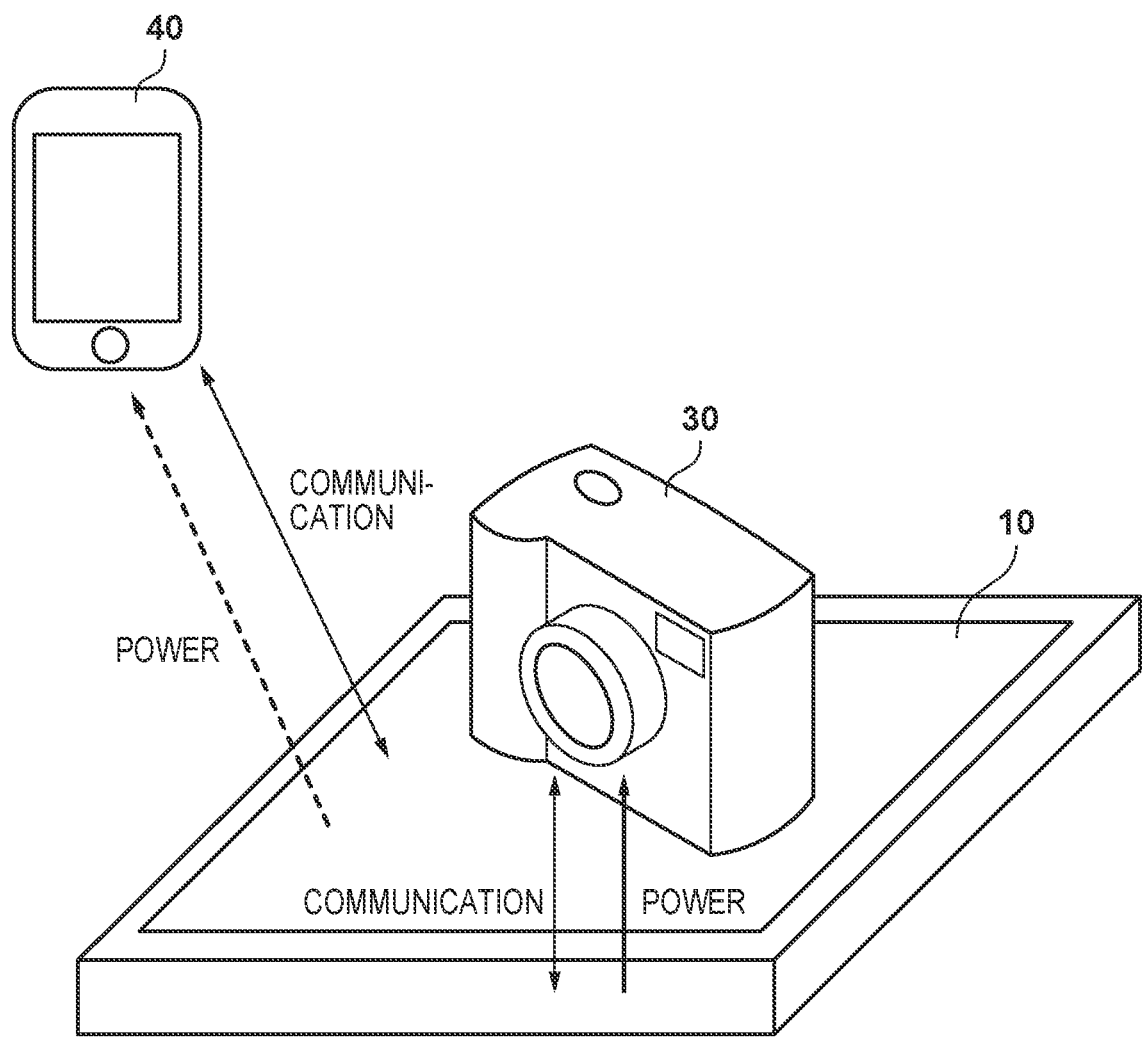
FIG. 1 is a diagram showing a system configuration of the present embodiment.

First, the configuration of a non-contact power supply system of the present embodiment will be described with reference to FIG. 1.

In the non-contact power supply system of the present embodiment, power can be supplied to a power reception apparatus 30 that is within the range of a region in which a power supply apparatus 10 can supply power, through wireless power supply without wired connection. In wireless power supply, power is transmitted/received through electromagnetic waves being emitted from an antenna of the power supply apparatus 10 and being received by an antenna of the power reception apparatus 30. In addition, in the non-contact power supply system, various types of information used for power supply control are transmitted/received between the power supply apparatus 10 and the power reception apparatus 30 through wireless communication.

The power supply apparatus 10 and the power reception apparatus 30 perform wireless communication using predetermined protocol of NFC (Near Field Communication) or the like. If the power reception apparatus 30 is detected within the ranges of a region in which the power supply apparatus 10 can perform power supply and a region in which communication with the power supply apparatus 10 is possible, the power supply apparatus 10 performs wireless communication with the power reception apparatus 30, and starts power supply after the power reception apparatus 30 has been authenticated. Note that the region in which communication with the power supply apparatus 10 is possible is larger than the region in which the power supply apparatus 10 can perform power supply.

In addition, in the non-contact power supply system of the present embodiment, a case is envisioned in which, in addition to the power supply apparatus 10 and the power reception apparatus 30 to be supplied with power, there is a communication apparatus 40 that can communicate with the power supply apparatus 10, in the ranges of the region in which the power supply apparatus 10 can perform power supply and the region in which communication with the power supply apparatus 10 is possible. In the present embodiment, the communication apparatus 40 is an object that is not to be charged with power. In the present embodiment, only one communication apparatus 40 is illustrated, but there may be a plurality of communication apparatuses in some cases. Also, if the communication apparatus 40 other than the power reception apparatus 30 is within the ranges of the region in which the power supply apparatus 10 can perform power supply and the region in which communication with the power supply apparatus 10 is possible, control is performed in the non-contact power supply system of the present embodiment so as to not start power supply to the power reception apparatus 30, excluding special cases where power supply is permitted.

The power supply apparatus 10 of the present embodiment is a stationary apparatus that can supply power to and communicate with the power reception apparatus 30 in a state where the power reception apparatus 30 is disposed thereon, but the present invention is not limited thereto, and, for example, the power supply apparatus 10 of the present embodiment may also be an apparatus that supplies power to a mobile object such as automobile. In addition, the power supply apparatus 10 of the present embodiment may also be a power supply apparatus that wirelessly supplies power to the power reception apparatus 30 through electromagnetic induction, and may also be a power supply apparatus that wirelessly supplies power to the power reception apparatus 30 through electromagnetic field resonance.

The power reception apparatus 30 can charge a battery using power supplied from the power supply apparatus 10. Also, the power reception apparatus 30 operates using power supplied from the battery. The power reception apparatus 30 may also be, for example, an image capturing apparatus such as a digital camera, a communication terminal such as a mobile phone or a smart phone that is a type of mobile phone, an electronic device such as a mobile player that reproduces sound and video images, or a mobile object such as an automobile that operates using power from a battery. Also, the power reception apparatus 30 may also be a medical apparatus that can perform wireless communication, or a peripheral device such as a mouse, a speaker, a memory, or a battery.

The communication apparatus 40 may be a card-type or sticker-type electronic device that operates using power received from the power supply apparatus 10 during communication with the power supply apparatus 10. In addition, the communication apparatus 40 may also be a mobile object such as an automobile that operates using power in a battery, an image capturing apparatus such as a digital camera, a communication terminal such as a mobile phone or a smart phone that is a type of mobile phone, an electronic device such as a mobile player that reproduces sound and video images, or the like. In addition, the communication apparatus 40 may also be a medical apparatus that can perform wireless communication, or a peripheral device such as a mouse, a speaker, a memory, or a battery.

Apparatus Configuration

Figure 2:
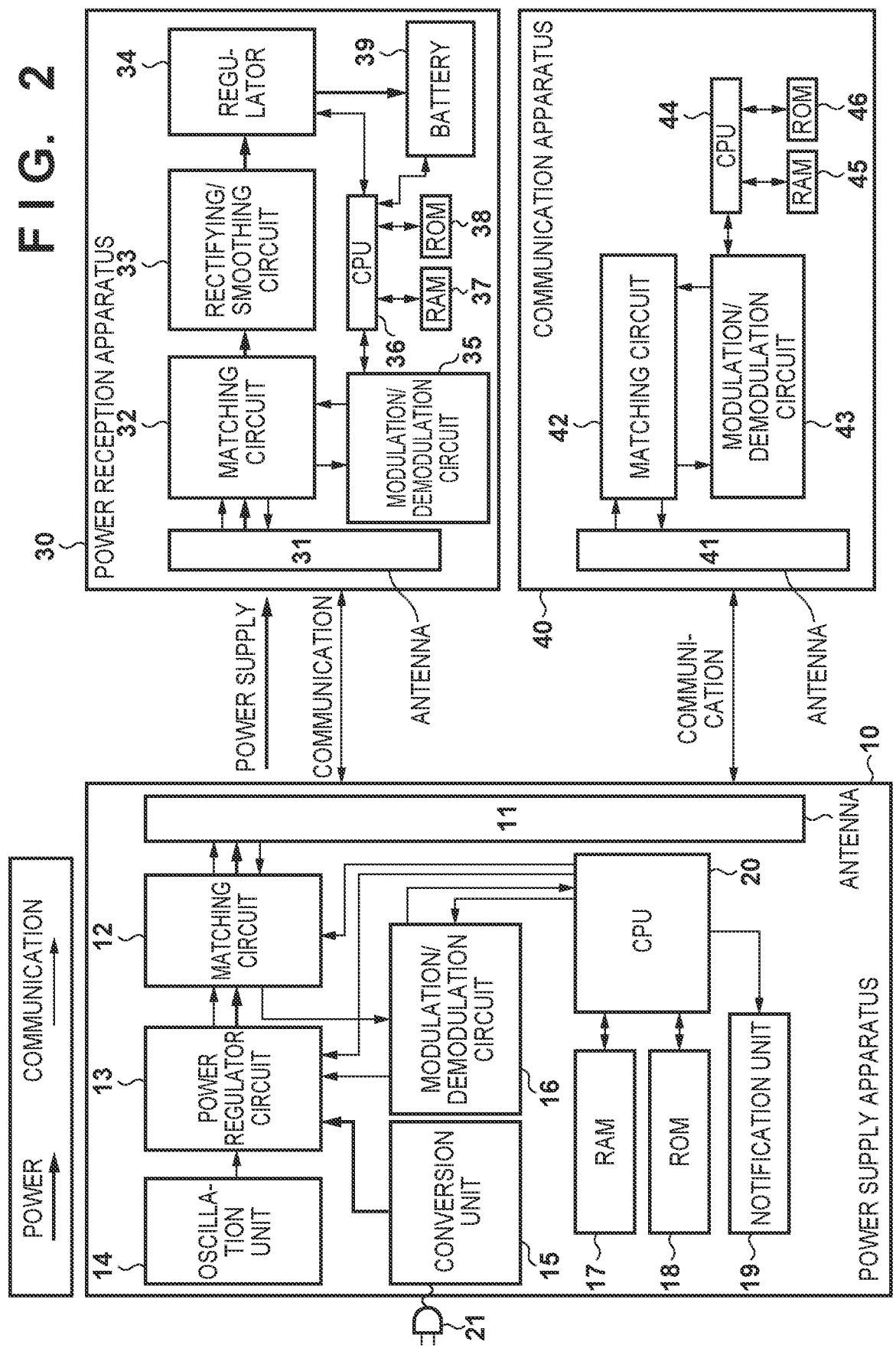
FIG. 2 is a block diagram showing an apparatus configuration of the present embodiment.

Next, the configurations of the power supply apparatus 10, the power reception apparatus 30, and the communication apparatus 40 in the non-contact power supply system of the present embodiment will be described with reference to FIG. 2.

First, the configuration and functions of the power supply apparatus 10 will be described.

The power supply apparatus 10 has an antenna 11, a matching circuit 12, a power regulator circuit 13, an oscillation unit 14, a conversion unit 15, a modulation/demodulation circuit 16, a RAM 17, a ROM 18, a notification unit 19, a CPU 20, and a power source connector 21.

The antenna 11 is used for wirelessly transmitting power to the power reception apparatus 30 via an antenna 31, or for communicating with the power reception apparatus 30 and the communication apparatus 40 via the antenna 31 and an antenna 41. An aspect in which the antenna 11 is a coiled antenna and is coupled to the antenna 31 and the antenna 41 using inductance components is desirable, but there is no limitation thereto, and may also be coupled to the antenna 31 and the antenna 41 using capacitance.

The matching circuit 12 is a circuit that matches impedances in the antenna 11 and the power regulator circuit 13, or a resonant frequency of the antenna 11. The matching circuit 12 is configured by combining, in series and in parallel, passive elements that have inductance components or capacitance components, and it is desirable that the combination thereof is appropriately selected according to a desired matching state. In addition, changing or switching of the values of variable passive elements of the matching circuit 12 may also be enabled, and the values and switching may be controlled under control of the CPU 20 according to the state and position of the power reception apparatus 30 or the communication apparatus 40.

The power regulator circuit 13 is a circuit that has a function of adjusting an AC signal generated by the oscillation unit 14, to an AC signal of predetermined power, and outputting the signal to the matching circuit 12. The power regulator circuit 13 includes, for example, a power amplification unit constituted by a switching amplifier, and a power regulator unit constituted by a DC-DC converter that changes a voltage that is input from the conversion unit 15 to a predetermined voltage according to a control signal from the modulation/demodulation circuit 16 or the CPU 20, and the like. Note that it suffices for the power regulator circuit 13 to have the above power amplification function and power adjusting function, and the power regulator circuit 13 is not limited to above-described configuration.

The oscillation unit 14 is a circuit for constantly generating a signal of a predetermined frequency, and inputting the signal to the power regulator circuit 13, and includes a crystal oscillator and the like. In the case of a frequency band in which high power of up to 50 W is allowed to be output, the predetermined frequency may be in a frequency band of an ISM band belonging to an HF band such as 6.78 MHz or 13.56 MHz, or may also be in a frequency band belonging to an LF band such as a several hundred KHz.

The conversion unit 15 is a circuit for distributing, to the units, power that is input from the power source connector 21, and is a circuit for converting a commercial AC power source voltage into a predetermined DC voltage.

Note that the units of the power supply apparatus 10 operate using power supplied from the conversion unit 15.

The modulation/demodulation circuit 16 is a circuit that modulates/demodulates voltage signals of the antenna 11, the matching circuit 12, and the power regulator circuit 13, in order to allow the power supply apparatus 10 to transmit/receive data to/from the power reception apparatus 30 or the communication apparatus 40.

During data transmission, the modulation/demodulation circuit 16 receives, from the CPU 20, transmission data that has been encoded based on a predetermined protocol stored in the ROM 18, and inputs the data to the power regulator circuit 13 via a modulation circuit so as to modulate the transmission signal. Amplitude modulation is performed on a signal that is output by the power regulator circuit 13, according to the signal that is input from the modulation/demodulation circuit 16 to the power regulator circuit 13, and data can be transmitted via the antenna 11.

In addition, when receiving data, the modulation/demodulation circuit 16 detects a change in the voltage or current in the matching circuit 12, and demodulates receiving data using a demodulation circuit constituted by a filter, a comparator, a switch, and the like. The modulation/demodulation circuit 16 inputs the receiving data to the CPU 20, and the CPU 20 decodes the data based on a predetermined protocol stored in the ROM 18. Note that, for example, a protocol for near field communication stipulated as ISO/IEC 14443, ISO/IEC 15693, or ISO/IEC 18092 (NFC), a protocol that is compatible with this, or the like is used as the predetermined protocol.

The RAM 17 is a volatile memory that temporarily stores computer programs for controlling operations of the units of the power supply apparatus 10, information regarding operations of the units such as parameters, data received by the modulation/demodulation circuit 16 from the power reception apparatus 30 or the communication apparatus 40, and the like. The RAM 17 also stores a management table for managing devices to which the power supply apparatus 10 supplies power. Note that device information received from the power reception apparatus 30 or the communication apparatus 40 by the power supply apparatus 10 is registered in the management table stored in the RAM 17.

The ROM 18 is a nonvolatile memory that stores computer programs for controlling operations of the units of the power supply apparatus 10, parameters related to operations of the units, and the like. The ROM 18 also stores programs related to communication methods for allowing the power supply apparatus 10 to communicate with the power reception apparatus 30 and the communication apparatus 40.

The notification unit 19 notifies the user of a state where the power supply apparatus 10 can perform power supply, a state where power supply is limited, and the like. The notification unit 19 may be a display unit such as a display or a sound output unit such as a speaker, or may have a configuration in which these are combined.

The CPU 20 is an arithmetic processing apparatus for performing overall control of the power supply apparatus 10, and operates in accordance with programs stored in the ROM 18. The programs mentioned herein include a program for executing any of various flowcharts to be described later. Also, the CPU 20 changes and switches the values of the variable passive elements of the matching circuit 12. The CPU 20 also controls the power regulator circuit 13 so as to adjust power that is supplied to the power reception apparatus 30. Note that the CPU 20 may also measure supply power that is output from the power regulator circuit 13, using an internal A/D conversion function. In addition, the CPU 20 controls the modulation/demodulation circuit 16 so as to transmit/receive a command to/from the power reception apparatus 30 or the communication apparatus 40. Note that the command contains identification information for identifying an address, a command code that indicates an operation instructed by the command, and the like. Note that the CPU 20 can also transmit a command only to the power reception apparatus 30 or transmit a command only to the communication apparatus 40 by controlling the modulation/demodulation circuit 16 so as to change the identification information contained in the command.

The power source connector 21 is a connector for acquiring power from a commercial power source.

The power supply apparatus 10 of the present embodiment performs power supply control for wirelessly supplying, to the power reception apparatus 30, power that is sufficient for charging a battery 39 in the power reception apparatus 30. The power supply control of the present embodiment is realized by at least the antenna 11, the power regulator circuit 13, the oscillation unit 14, and the CPU 20, and the matching circuit 12 may also be included.

In addition, communication between the power supply apparatus 10 and the power reception apparatus 30 or the communication apparatus 40 in the present embodiment is realized by at least the antenna 11, the power regulator circuit 13, the oscillation unit 14, the modulation/demodulation circuit 16, the ROM 18, and the CPU 20, and the matching circuit 12 may also be included.

Note that the configurations of the units 11 to 21 of the power supply apparatus 10 are not limited to those described above, and if similar functions are to be provided, there may be a plurality of the same units respectively, and each unit may be configured to have another function, or may be combined with another block.

Next, the configuration and functions of the power reception apparatus 30 of the present embodiment will be described.

The power reception apparatus 30 has the antenna 31, a matching circuit 32, a rectifying/smoothing circuit 33, a regulator 34, a modulation/demodulation circuit 35, a CPU 36, a RAM 37, a ROM 38, and the battery 39.

The antenna 31 is used for wirelessly receiving power from the power supply apparatus 10 via the antenna 11, or communicating with the power supply apparatus 10 via the antenna 11. An aspect in which the antenna 31 is a coiled antenna and is coupled to the antenna 11 using inductance components is desirable, but there is no limitation thereto, and capacitive coupling may also be adopted.

The matching circuit 32 is a circuit that matches impedances in the antenna 31 and the rectifying/smoothing circuit 33, or a resonant frequency of the antenna 31. The matching circuit 32 is configured by combining, in series and in parallel, passive elements that have inductance components or capacitance components, and it is desirable that the combination thereof is appropriately selected according to a desired matching state. In addition, changing or switching of the values of variable passive elements of the matching circuit 32 may also be enabled, and the values and switching may be controlled under control of the CPU 36 according to the mode and the load state of the power reception apparatus 30.

The rectifying/smoothing circuit 33 is a circuit that converts AC power that is output from the matching circuit 32 into DC power, and includes a diode and a capacitor.

The regulator 34 is a circuit that converts the voltage of DC power that is output from the rectifying/smoothing circuit 33 into a predetermined voltage. Note that the predetermined voltage generated in the regulator 34 is supplied to the units of the power reception apparatus 30. In addition, the regulator 34 is connected to the battery 39, and charges the battery 39 with power supplied from the power supply apparatus 10, under control of the CPU 36.

The modulation/demodulation circuit 35 is a circuit that modulates/demodulates voltage signals of the antenna 31 and the matching circuit 32 in order to enable the power reception apparatus 30 to transmit/receive data to/from the power supply apparatus 10. In addition, while receiving data, the modulation/demodulation circuit 35 detects a change in the voltage or current in the matching circuit 32, and demodulates receiving data using a demodulation circuit constituted by a filter, a comparator, a switch, and the like. The modulation/demodulation circuit 16 inputs receiving data to the CPU 36, and the CPU 36 decodes the data based on a predetermined protocol stored in the ROM 38. During data transmission, the modulation/demodulation circuit 16 receives, from the CPU 36, transmission data encoded based on the predetermined protocol stored in the ROM 38, and causes a modulation circuit to modulate a transmission signal. Note that the modulation circuit of the modulation/demodulation circuit 35, which includes a switch and a resistor, and in which load modulation is performed by changing the load according to a transmission data signal, can transmit the data via the antenna 31. Note that, for example, a protocol of near field communication stipulated as ISO/IEC 14443, ISO/IEC 15693, or ISO/IEC 18092 (NFC), a protocol that is compatible with this, or the like is used as the predetermined protocol.

The CPU 36 is an arithmetic processing apparatus for performing overall control of the power reception apparatus 30, and operates in accordance with programs stored in the ROM 38. The programs mentioned herein include a program for executing any of various flowcharts to be described later. Also, the CPU 36 changes and switches the values of the variable passive elements of the matching circuit 32. The CPU 36 also controls the regulator 34 so as to charge the battery 39 with power supplied from the power supply apparatus 10. Note that, when controlling the regulator 34, the CPU 36 may also detect the residual storage amount of the battery 39 using an internal A/D conversion function. In addition, the CPU 36 may also perform control while switching trickle charge control, high-speed charge control, constant voltage control, constant current control, and the like, according to the residual storage amount of the battery 39. The CPU 36 controls the modulation/demodulation circuit 35 so as to transmit/receive a command to/from the power supply apparatus 10. Note that the command includes identification information for identifying an address and information for responding to a command code indicating an operation instructed by the command, or the like. Note that the CPU 36 may also control the modulation/demodulation circuit 35 so as to request the power supply apparatus 10 to change the supply power, according to the residual storage amount of the battery 39. In addition, if power that is sufficient for the CPU 36 to operate is not supplied from the power supply apparatus 10, the battery 39 is charged, and the CPU 36 is then allowed to operate using the battery 39.

The RAM 37 is a volatile memory that temporarily stores computer programs for controlling operations of the units of the power reception apparatus 30, information regarding operations of the units such as parameters, data received from the power supply apparatus 10, and the like.

The ROM 38 is a nonvolatile memory that stores computer programs for controlling operations of the units of the power reception apparatus 30, parameters related to operations of the units, and the like. The ROM 38 also stores device information of the power reception apparatus 30, information regarding the power receiving ability of the power reception apparatus 30, display data, and the like. The device information of the power reception apparatus 30 includes identification information (ID), the manufacturer name, the device name, and the date of manufacture of the power reception apparatus 30, a communication method that the power reception apparatus 30 complies with, information indicating whether or not the power reception apparatus 30 has a function for receiving wirelessly supplied power from the power supply apparatus 10, and the like. Note that the CPU 36 can control the modulation/demodulation circuit 35 so as to transmit various types of information stored in the ROM 38 to the power supply apparatus 10. The battery 39 is a battery that can be removed from the power reception apparatus 30. Also, the battery 39 is a rechargeable secondary battery, and is a lithium ion battery or the like. The battery 39 supplies power to the units of the power reception apparatus 30.

Note that the configurations of the units 31 to 39 of the power reception apparatus 30 are not limited to those described above, and if similar functions are to be provided, there may be a plurality of the same units respectively, and each unit may be configured to have another function, or may be combined with another block. In addition, in the present embodiment, the power supply apparatus 10 wirelessly transmits power to the power reception apparatus 30, and the power reception apparatus 30 wirelessly receives power from the power supply apparatus 10, but "wireless" may be replaced with "non-contact" or "contactless".

Next, the configuration and functions of the communication apparatus 40 of the present embodiment will be described.

The communication apparatus 40 of the present embodiment has the antenna 41, a matching circuit 42, a modulation/demodulation circuit 43, a CPU 44, a RAM 45, and a ROM 46.

Note that the configuration of the communication apparatus 40 is the same as the power reception apparatus 30 in many parts, and thus a description will be given below with a focus on the differences from the power reception apparatus 30.

The communication apparatus 40 of the present embodiment has no battery, and thus a battery is not charged with power supplied from the power supply apparatus 10, but can receive power for operating the communication apparatus 40, from the power supply apparatus 10.

The CPU 44 performs control that is substantially the same as that of the CPU 36 of the power reception apparatus 30, but does not perform charge control.

Note that the communication apparatus 40 may also be configured to have a battery similar to the power reception apparatus 30, as long as an aspect is adopted in which the battery is not charged with power supplied from the power supply apparatus 10. As an aspect in which the battery is not charged, a state where the battery is fully charged, a state where charge is limited, and the like are conceivable.

Note that the configurations of the units 41 to 46 of the communication apparatus 40 are not limited to those described above, and if similar functions are to be provided, there may be a plurality of the same units respectively, and each unit may be configured to have another function, or may be combined with another block.

Power Supply Operation

Figure 3:
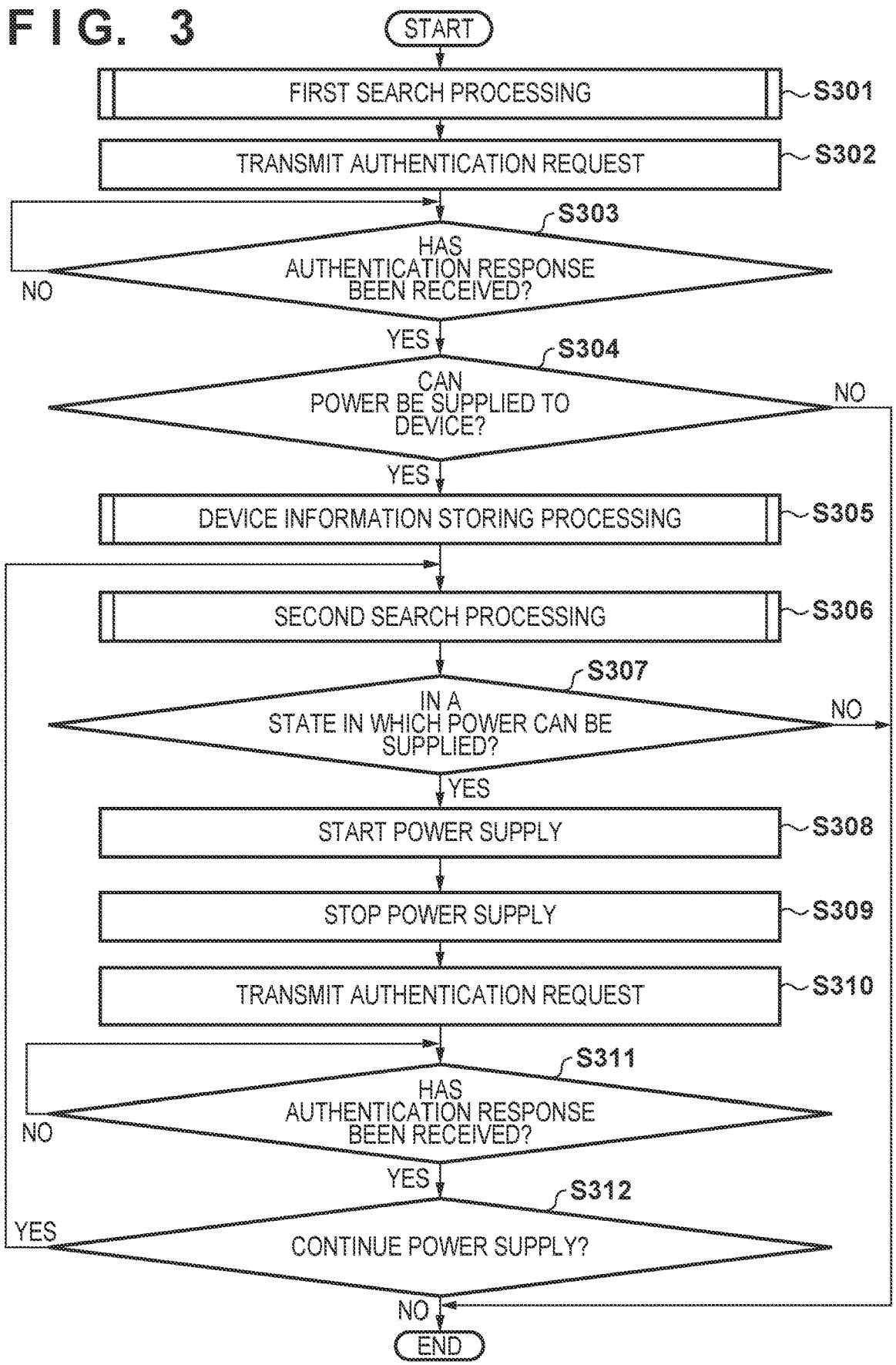
FIG. 3 is a flowchart showing a power supply operation of a first embodiment.

Next, a power supply operation that is performed by the power supply apparatus 10 of the present embodiment will be described with reference to FIG. 3. Note that the processing in FIG. 3 is realized by the CPU 20 of the power supply apparatus 10 executing a program stored in the ROM 18. This applies to FIGS. 4 to 6B to be described later.

In step S301, the CPU 20 controls the modulation/demodulation circuit 16 so as to perform first search processing for searching for the power reception apparatus 30. The first search processing will be described later in detail. When the CPU 20 ends the first search processing, the procedure advances to step S302.

In step S302, the CPU 20 transmits an authentication request to the power reception apparatus 30 detected in step S301. The CPU 20 controls the modulation/demodulation circuit 16 based on a predetermined communication protocol so as to transmit a command for authentication to the power reception apparatus 30. After transmitting the authentication request, the CPU 20 advances the procedure to step S303.

In step S303, the CPU 20 determines whether or not an authentication response has been received from the power reception apparatus 30. The CPU 20 receives, via the modulation/demodulation circuit 16, an authentication response signal generated by the CPU 36 if authentication processing was successful in the power reception apparatus 30. This authentication response signal contains device information of the power reception apparatus 30 and the like. The device information includes the ID, function, and specifications of the power reception apparatus 30, and the like, and also includes information regarding whether or not the power reception apparatus 30 is a device to which power can be supplied. If it is determined that an authentication response has not been received from the power reception apparatus 30 (NO in step S303), the CPU 20 repeats the processing of step S303 until an authentication response is received, but ends the procedure if an authentication response from the power reception apparatus 30 has not been received for a predetermined period of time. In addition, if it is determined that an authentication response has been received from the power reception apparatus 30 (YES in step S303), the CPU 20 advances the procedure to step S304.

In step S304, the CPU 20 analyzes the device information contained in the authentication response signal received from the power reception apparatus 30, and determines whether or not the power reception apparatus 30 is a device to which power can be supplied. If it is determined that the power reception apparatus 30 is a device to which power can be supplied (YES in step S304), the CPU 20 advances the procedure to step S305, and if it is determined that the power reception apparatus 30 is not a device to which power can be supplied (NO in step S304), ends the procedure.

In step S305, the CPU 20 performs device information storing processing for storing the device information of the power reception apparatus 30. The device information storing processing will be described later in detail. When the CPU 20 ends the device information storing processing, the procedure advances to step S306.

In step S306, the CPU 20 controls the modulation/demodulation circuit 16 so as to perform second search processing for searching for the communication apparatus 40 other than the power reception apparatus 30. The second search processing will be described later in detail. When the CPU 20 ends the second search processing, the procedure advances to step S307.

In step S307, the CPU 20 determines whether or not the power supply apparatus 10 can supply power to the power reception apparatus 30. The CPU 20 determines whether or not power supply is possible by checking a flag that is included in the information stored in the RAM 17 and indicates that power supply is possible. If it is determined that the power supply apparatus 10 can supply power to the power reception apparatus 30 (YES in step S307), the CPU 20 advances the procedure to step S308, and if it is determined that power supply is not possible (NO in step S307), ends the procedure.

In step S308, the CPU 20 performs control for starting power supply to the power reception apparatus 30. Here, the control for starting power supply refers to the CPU 20 sending a control signal to the power regulator circuit 13, and thereby transmitting, to the power reception apparatus 30, power that is sufficient for charging the battery 39 of the power reception apparatus 30. Once a predetermined period of time has elapsed after the CPU 20 starts power supply to the power reception apparatus 30, the procedure advances to step S309.

In step S309, the CPU 20 performs control for stopping power supply to the power reception apparatus 30, and resets the flag that is included in the information stored in the RAM 17 and indicates that power supply is possible. Here, the control for stopping power supply refers to control in which the CPU 20 limits output of the power regulator circuit 13 to power that is sufficient for communicating with the power reception apparatus 30. When the CPU 20 performs the control for stopping power supply, the procedure advances to step S310.

In step S310, the CPU 20 performs processing that is similar to the processing of step S302. After transmitting the authentication request, the CPU 20 advances the procedure to step S311.

In step S311, the CPU 20 performs processing that is similar to the processing of step S303. If it is determined that an authentication response has not been received from the power reception apparatus 30 (NO in step S311), the CPU 20 repeats the processing of step S311 until an authentication response is received, but ends the procedure if an authentication response from the power reception apparatus 30 is not received for a predetermined period of time. In addition, if it is determined that an authentication response has been received from the power reception apparatus 30 (YES in step S311), the CPU 20 advances the procedure to step S312.

In step S312, the CPU 20 determines whether or not to supply power to the power reception apparatus 30 again. The CPU 20 analyzes the device information contained in the authentication response signal received in step S311, and determines whether or not the power reception apparatus 30 is ready for power supply again. If it is determined that the power reception apparatus 30 is ready for power supply again (YES in step S312), the CPU 20 returns the procedure to step S306, and repeatedly performs the processing from step S306 onward, and if it is determined that the power reception apparatus 30 is not ready for power supply again (NO in step S312), ends the procedure. Note that, in the case of NO in step S312, the processing from step S301 onward may be performed repeatedly without ending the procedure.

First Search Processing (Step S301)

Figure 4:
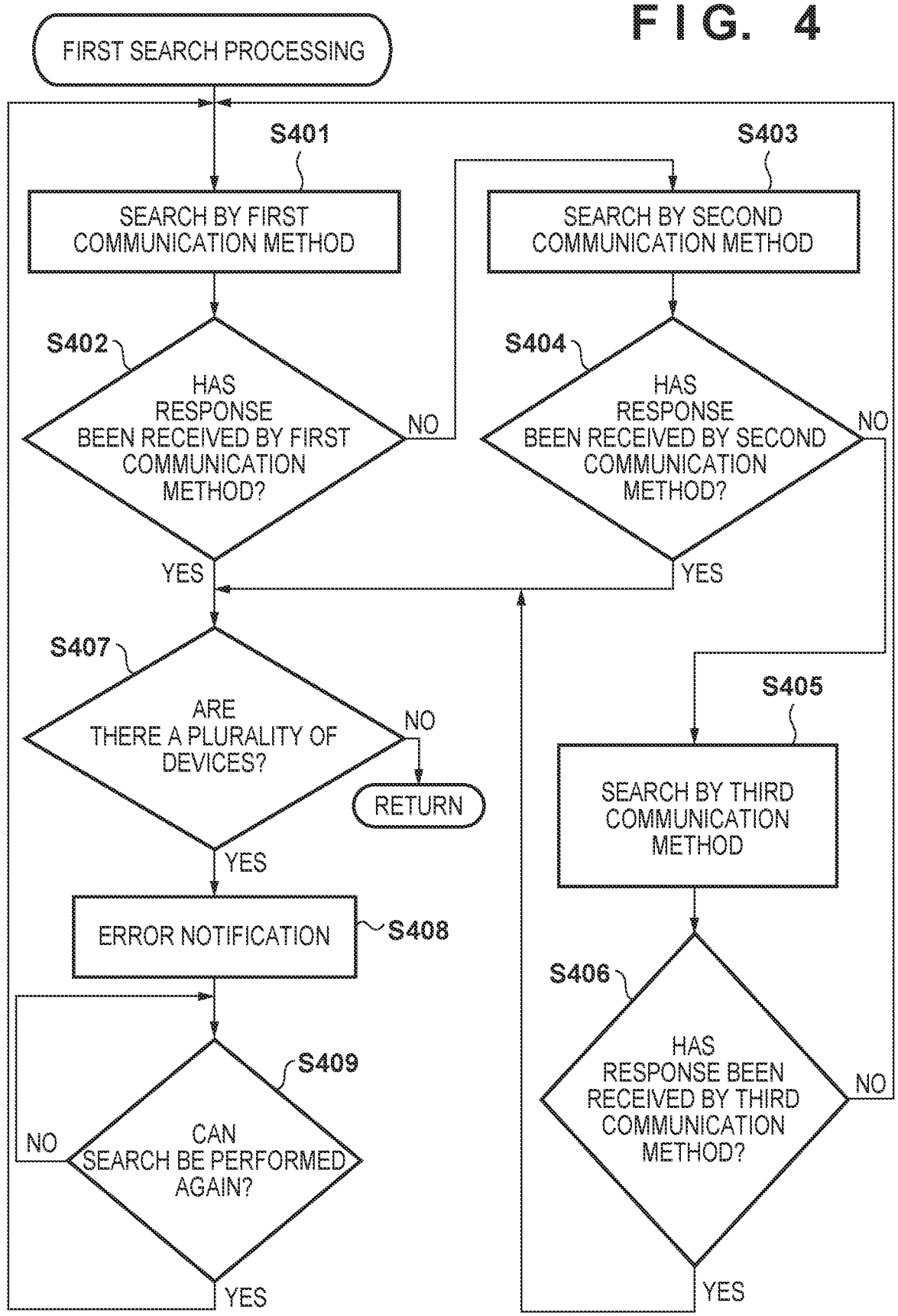
FIG. 4 is a flowchart showing first search processing in FIG. 3.

Next, the first search processing in step S301 in FIG. 3 will be described with reference to FIG. 4.

In step S401, the CPU 20 controls the modulation/demodulation circuit 16 based on a first communication method stored in the ROM 18, so as to search for the power reception apparatus 30. Once the CPU 20 has detected the power reception apparatus 30 using the first communication method, the procedure advances to step S402.

In step S402, the CPU 20 determines whether or not a response to the search performed using the first communication method in step S401 has been received from the power reception apparatus 30. If the CPU 20 confirms a response from the power reception apparatus 30 (YES in step S402), the procedure advances to step S407, and if the CPU 20 has not confirmed a response from the power reception apparatus 30 for a predetermined period of time (NO in step S402), the procedure advances to step S403.

In step S403, the CPU 20 controls the modulation/demodulation circuit 16 based on a second communication method stored in the ROM 18, so as to search for the power reception apparatus 30. Once the CPU 20 detects the power reception apparatus 30 using the second communication method, the procedure advances to step S404.

In step S404, the CPU 20 determines whether or not a response to the search performed using the second communication method in step S403 has been received from the power reception apparatus 30. If the CPU 20 confirms a response from the power reception apparatus 30 (YES in step S404), the procedure advances to step S407, and if the CPU 20 has not confirmed a response from the power reception apparatus 30 for a predetermined period of time (NO in step S404), the procedure advances to step S405.

In step S405, the CPU 20 controls the modulation/demodulation circuit 16 based on a third communication method stored in the ROM 18, so as to search for the power reception apparatus 30. Once the CPU 20 has detected the power reception apparatus 30 using the third communication method, the procedure advances to step S406.

In step S406, the CPU 20 determines whether or not a response to the search performed using the third communication method in step S406 has been received from the power reception apparatus 30. If the CPU 20 has confirmed a response from the power reception apparatus 30 (YES in step S406), the procedure advances to step S407, and if the CPU 20 has not confirmed a response from the power reception apparatus 30 for a predetermined period of time (NO in step S406), the procedure returns to step S401, and the processing from step S401 onward is repeated.

Note that the first search processing performed using each of the first to third communication methods is, for example, polling processing in which Type A. Type B, and Type F request commands are sequentially transmitted using NFC, but there is no limitation thereto. This also applies to second search processing to be described later.

Note that the search processes performed using the first to third communication methods in steps S401 to S406 may be performed in any order. In addition, processes that are performed in parallel are not limited to the processes performed using three communication methods, and less than three types of processes and four or more types of processes may also be adopted. In the present embodiment, processes performed using three communication methods are illustrated, and there is no limitation thereto. In addition, the above search processes may also be repeated periodically for each predetermined period of time.

In step S407, the CPU 20 determines whether or not a device was detected in steps S401 to S406 other than the power reception apparatus 30. If the CPU 20 determines that there is a device other than the power reception apparatus (YES in step S407), the procedure advances to step S408, and if the CPU 20 determines that there is no device other than the power reception apparatus (NO in step S407), the procedure ends.

In step S408, the CPU 20 controls the notification unit 19 so as to perform error notification to inform the user that power supply cannot be started due to a plurality of devices having been detected, and prompts the user to remove the communication apparatus 40 from the range in which communication with the power supply apparatus 10 is possible. Once the CPU 20 ends the error notification, the procedure advances to step S409.

In step S409, the CPU 20 determines whether or not the power reception apparatus 30 can be searched for again. After notifying the user of an error, the CPU 20 determines that the power reception apparatus 30 can be searched for again when the user removes the communication apparatus 40 and operates the power supply apparatus 10. If the CPU 20 determines that the power reception apparatus 30 can be searched for again (YES in step S409), the procedure returns to step S401, and the processing from step S401 onward is repeated, and if the CPU 20 determines that the power reception apparatus 30 cannot be searched for again (NO in step S409) the processing of step S409 onward is repeated until the power reception apparatus 30 can be searched for again. In addition, if the CPU 20 continues to determine, for a predetermined period of time, that the power reception apparatus 30 cannot be searched for again, the procedure ends.

Device Information Storing Processing (Step S305)

Figure 5:
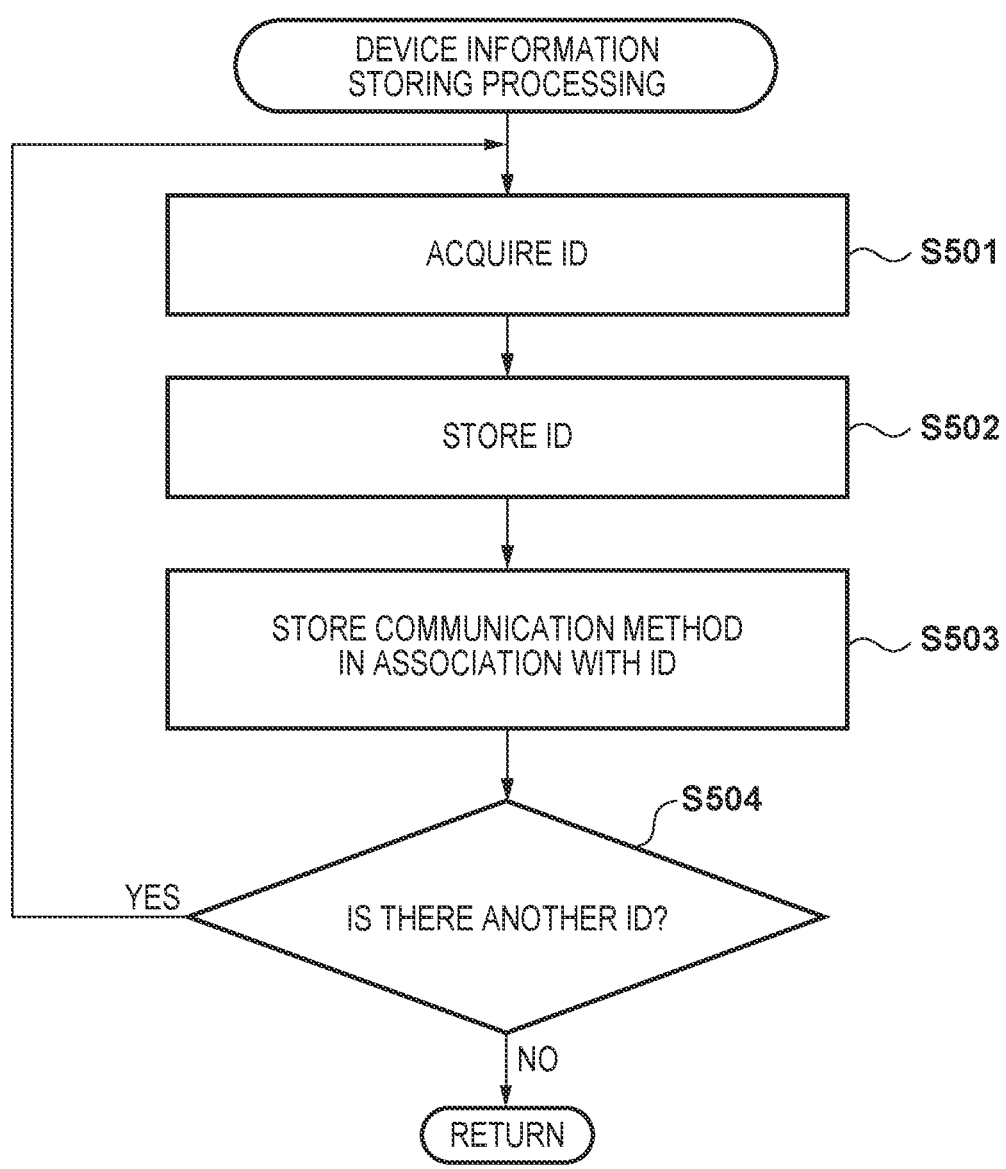
FIG. 5 is a flowchart showing device information storing processing in FIG. 3.

Next, the device information storing processing in step S305 in FIG. 3 will be described with reference to FIG. 5.

In step S501, the CPU 20 acquires identification information of the power reception apparatus 30 from the authentication information acquired in step S303. After acquiring the identification information of the power reception apparatus 30, the CPU 20 advances the procedure to step S502.

In step S502, the CPU 20 stores the identification information of the power reception apparatus 30 acquired in step S501, in the RAM 17. The CPU 20 advances the procedure to step S503 after storing the identification information of the power reception apparatus 30 in the RAM 17.

In step S503, the CPU 20 stores, in the RAM 17, information regarding the communication method used for detecting the power reception apparatus 30, along with and in association with the identification information of the power reception apparatus 30 acquired in step S502. After storing, in the RAM 17, the information regarding the communication method used for detecting the power reception apparatus 30 along with and in association with the identification information of the power reception apparatus 30, the CPU 20 advances the procedure to step S504.

In step S504, the CPU 20 determines whether or not the authentication information acquired in step S303 includes identification information other than the identification information of the power reception apparatus 30. This is because some devices comply with a plurality of communication methods. If the CPU 20 determines that there is no other identification information (NO in step S504), the procedure ends, and if the CPU 20 determines that there is other identification information (YES in step S504), the procedure returns to step S501, and the processing from step S501 onward is repeated.

Second Search Processing (Step S306)

Figure 6A:
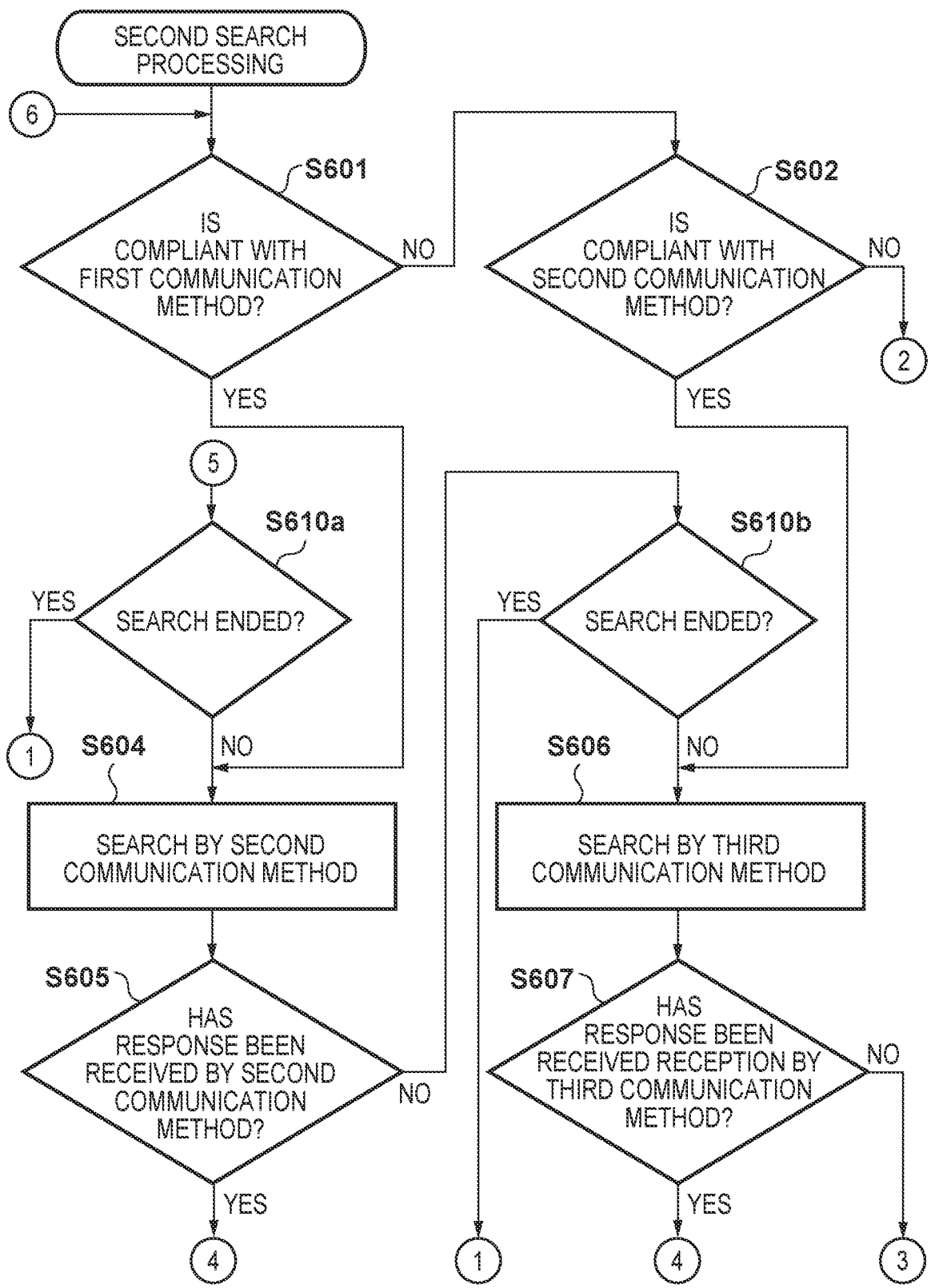
FIG. 6A is a flowchart showing second search processing in FIG. 3.
Figure 6B:
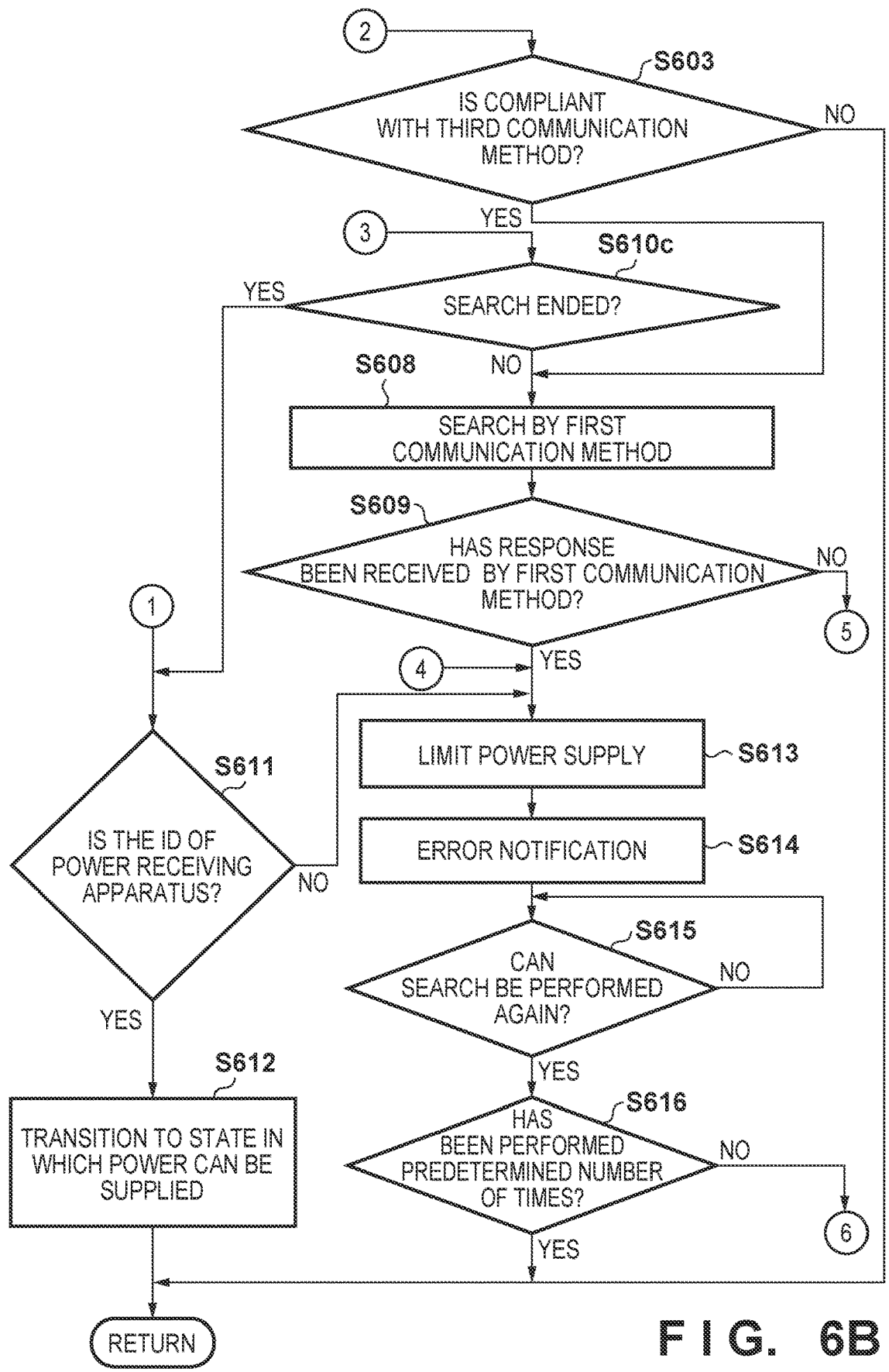
FIG. 6B is a flowchart showing the second search processing in FIG. 3.

Next, the second search processing of step S306 in FIG. 3 will be described with reference to FIGS. 6A and 6B.

In step S601, the CPU 20 determines whether or not the power reception apparatus 30 complies with the first communication method. The CPU 20 performs the determination using the device information storing processing of step S305 using the information stored in the RAM 17. If the CPU 20 determines that the power reception apparatus 30 complies with the first communication method (YES in step S601), the procedure advances to step S604, and if the CPU 20 determines that the power reception apparatus 30 does not comply with the first communication method (NO in step S601), the procedure advances to step S602.

In step S602, the CPU 20 determines whether or not the power reception apparatus 30 complies with the second communication method. The CPU 20 performs the determination using the device information storing processing of step S305 using the information stored in the RAM 17. If the CPU 20 determines that the power reception apparatus 30 complies with the second communication method (YES in step S602), the procedure advances to step S606, and if the CPU 20 determines that the power reception apparatus 30 does not comply with the second communication method (NO in step S602), the procedure advances to step S603.

In step S603, the CPU 20 determines whether or not the power reception apparatus 30 complies with the third communication method. The CPU 20 performs the determination using the device information storing processing of step S305 using the information stored in the RAM 17. If the CPU 20 determines that the power reception apparatus 30 complies with the second communication method (YES in step S603), the procedure advances to step S608, and if the CPU 20 determines that the power reception apparatus 30 does not comply with the third communication method (NO in step S603), the procedure ends.

In step S604, the CPU 20 controls the modulation/demodulation circuit 16 based on the second communication method stored in the ROM 18, so as to search for the communication apparatus 40 other than the power reception apparatus 30. Once the CPU 20 has detected the communication apparatus 40 using the second communication method, the procedure advances to step S605.

In step S605, the CPU 20 determines whether or not a response to the search performed using the second communication method in step S604 has been received from the communication apparatus 40. If the CPU 20 determines that a response has been received from the communication apparatus 40 (YES in step S605), the procedure advances to step S613, and if the CPU 20 determines that a response has not been received from the communication apparatus 40 for a predetermined period of time (NO in step S605), the procedure advances to step S610*b*.

In step S606, the CPU 20 controls the modulation/demodulation circuit 16 based on the third communication method stored in the ROM 18, so as to search for the communication apparatus 40 other than the power reception apparatus 30, and advances the procedure to step S607.

In step S607, the CPU 20 determines whether or not a response to the search performed using the third communication method in step S606 has been received from the communication apparatus 40. If the CPU 20 determines that a response has been received from the communication apparatus 40 (YES in step S607), the procedure advances to step S613, and if the CPU 20 determines that a response has not been received from the communication apparatus 40 for a predetermined period of time (NO in step S607), the procedure advances to step S610*c*.

In step S608, the CPU 20 controls the modulation/demodulation circuit 16 based on the first communication method stored in the ROM 18, so as to search for the communication apparatus 40 other than the power reception apparatus 30, and advances the procedure to step S609.

In step S609, the CPU 20 determines whether or not a response to the search performed using the first communication method in step S608 has been received from the communication apparatus 40. If the CPU 20 determines that a response has been received from the communication apparatus 40 (YES in step S609), the procedure advances to step S613, and if the CPU 20 determines that a response has not been received from the communication apparatus 40 for a predetermined period of time (NO in step S609), the procedure advances to step S610*a*.

Note that, if the ID of the power reception apparatus 30 is searched for in each of the processes of steps S604, S606 and S608, the CPU 20 stores the ID information in the RAM 17.

In step S610*a*, the CPU 20 determines whether or not to end the search for the communication apparatus 40, by determining whether or not the power supply apparatus 10 has searched for the communication apparatus 40 using the first to third communication methods. If the CPU 20 determines that the power supply apparatus 10 has searched for the communication apparatus 40 using the first to third communication methods, and makes a determination to end the search (YES in step S610a), the procedure advances to step S611. Also, if the CPU 20 determines that the power supply apparatus 10 has not searched for the communication apparatus 40 using the first to third communication methods, and makes a determination to continue the search (NO in step S610a), the procedure advances to step S604.

In step S610b, the CPU 20 performs a process that is similar to the process of step S610a. The CPU 20 determines whether or not to end the search for the communication apparatus 40, by determining whether or not the power supply apparatus 10 has searched for the communication apparatus 40 using the first to third communication methods. If the CPU 20 determines that the power supply apparatus 10 has searched for the communication apparatus 40 using the first to third communication methods, and makes a determination to end the search (YES in step S610b), the procedure advances to step S611. Also, if the CPU 20 determines that the power supply apparatus 10 has not searched for the communication apparatus 40 using the first to third communication methods, and makes a determination to continue the search (NO in step S610b), the procedure advances to step S606.

In step S610c, the CPU 20 performs processes that are similar to those of steps S610a and S610b. The CPU 20 determines whether or not to end the search for the communication apparatus 40 by determining whether or not the power supply apparatus 10 has searched for the communication apparatus 40 using the first to third communication methods. If the CPU 20 determines that the power supply apparatus 10 has searched for the communication apparatus 40 using the first to third communication methods, and makes a determination to end the search (YES in step S610c), the procedure advances to step S611. Also, if the CPU 20 determines that the power supply apparatus 10 has not searched for the communication apparatus 40 using the first to third communication methods, and makes a determination to continue the search (NO in step S610c), the procedure advances to step S608.

In step S611, the CPU 20 determines whether or not the ID of the power reception apparatus 30 was detected in the search processes of steps S604, S606 and S608, by analyzing the information stored in the RAM 17. If the CPU 20 determines that the ID of the power reception apparatus 30 was detected in the processes of steps S604, S606 and S608 (YES in step S611), the procedure advances to step S612, and if the CPU 20 determines that the ID of the power reception apparatus 30 was not detected (NO in step S611), the procedure advances to step S613.

In step S612, the CPU 20 sets the flag stored in the RAM 17 and indicating that power supply is possible, thereby transitioning the state of the power supply apparatus 10 to a state where power supply to the power reception apparatus 30 is possible. In a state where the flag indicating that power supply is possible is set, the power supply apparatus 10 can supply power to the power reception apparatus 30. After setting the flag stored in the RAM 17 and indicating that power supply is possible, the CPU 20 ends the procedure.

In step S613, the CPU 20 resets the flag stored in the RAM 17 and indicating that power supply is possible, thereby changing the state of the power supply apparatus 10 to a state where power supply to the power reception apparatus 30 is not possible. In the state where the flag indicating that power supply is possible is reset, the power supply apparatus 10 cannot start power supply to the power reception apparatus 30. After resetting the flag stored in the RAM 17 and indicating that power supply is possible, the CPU 20 advances the procedure to step S614.

In step S614, the CPU 20 controls the notification unit 19 so as to perform error notification for informing the user that power supply cannot be started due to the presence of the communication apparatus 40 or absence of the power reception apparatus 30, and advances the procedure to step S615. By performing error notification, the CPU 20 prompts the user to remove the communication apparatus 40 from the range in which communication with the power supply apparatus 10 is possible, or to dispose the power reception apparatus 30 in the range in which communication with the power supply apparatus 10 is possible.

In step S615, the CPU 20 determines whether or not it is possible to search for the power reception apparatus 30 and the communication apparatus 40 again. After notifying the user of an error, the CPU 20 determines that it is possible to perform the search again if the user has removed the communication apparatus 40 or has disposed the power reception apparatus 30 and operated the power supply apparatus 10. If the CPU 20 determines that it is possible to search for the power reception apparatus 30 and the communication apparatus 40 again (YES in step S615), the procedure advances to step S616, and if the CPU 20 determines that it is not possible to search for the power reception apparatus 30 again (NO in step S615), the process of step S615 is repeated until it is possible to perform the search again. In addition, if the CPU 20 continues to determine, for a predetermined period of time, that it is not possible to perform the search again, the procedure ends, and the procedure returns to the start point in FIG. 3.

In step S616, the CPU 20 determines whether or not the power reception apparatus 30 and the communication apparatus 40 have been searched for again a predetermined number of times or more. If the CPU 20 determines that the power reception apparatus 30 and the communication apparatus 40 have been searched for again a predetermined number of times or more (YES in step S616), the procedure ends, and if the CPU 20 determines that the search has not been performed a predetermined number of times or more (NO in step S616), the procedure returns to step S601, and the processing from step S601 onward is repeated.

As described above, according to the power supply control of the present embodiment, even if the power reception apparatus 30 is detected through the first search processing, if the communication apparatus 40 other than the power reception apparatus 30 is detected through the second search processing, control is performed such that power supply cannot be started. Specifically, in a state where the communication apparatus 40 other than the power reception apparatus 30 is initially arranged on the power supply apparatus 10, or is arranged at the same time as the power reception apparatus 30, it is possible to limit power supply to the power reception apparatus 30. In this manner, by searching for the communication apparatus 40 other than the power reception apparatus 30 at a predetermined timing before power supply, power supply to the power reception apparatus 30 can be started so as to not supply power to the communication apparatus 40 other than the power reception apparatus 30.

Second Embodiment

Next, a second embodiment will be described.

For ease of description, description will be given below with a focus on differences from the first embodiment. In addition, the system configuration and apparatus configuration of the present embodiment are similar to those of the first embodiment shown in FIGS. 1 and 2, and operation processing of a power supply apparatus 10 is different from the first embodiment.

In the present embodiment, similarly to the first embodiment, by searching for the communication apparatus 40 other than a power reception apparatus 30 at a predetermined timing before supplying power, start of power supply is limited so as to not supply power to the communication apparatus 40 other than the power reception apparatus 30. In particular, in the present embodiment, in a state where the communication apparatus 40 is inserted during the operation processing of the power supply apparatus 10, if the power supply apparatus 10 performs processing for communicating with the power reception apparatus 30 every time, control is performed so as to limit power supply to the power reception apparatus 30. Furthermore, in order to suppress communication processing that is performed every time to a minimum, the communication apparatus 40 is searched for when a command indicating a power supply request has been received from the power reception apparatus 30, without authenticating the power reception apparatus 30 every time.

Power Supply Operation

Next, a power supply operation that is performed by the power supply apparatus 10 of the second embodiment will be described with reference to FIG. 7. Note that the processing in FIG. 7 is realized by a CPU 20 executing a computer program stored in a ROM 18.

Figure 7:
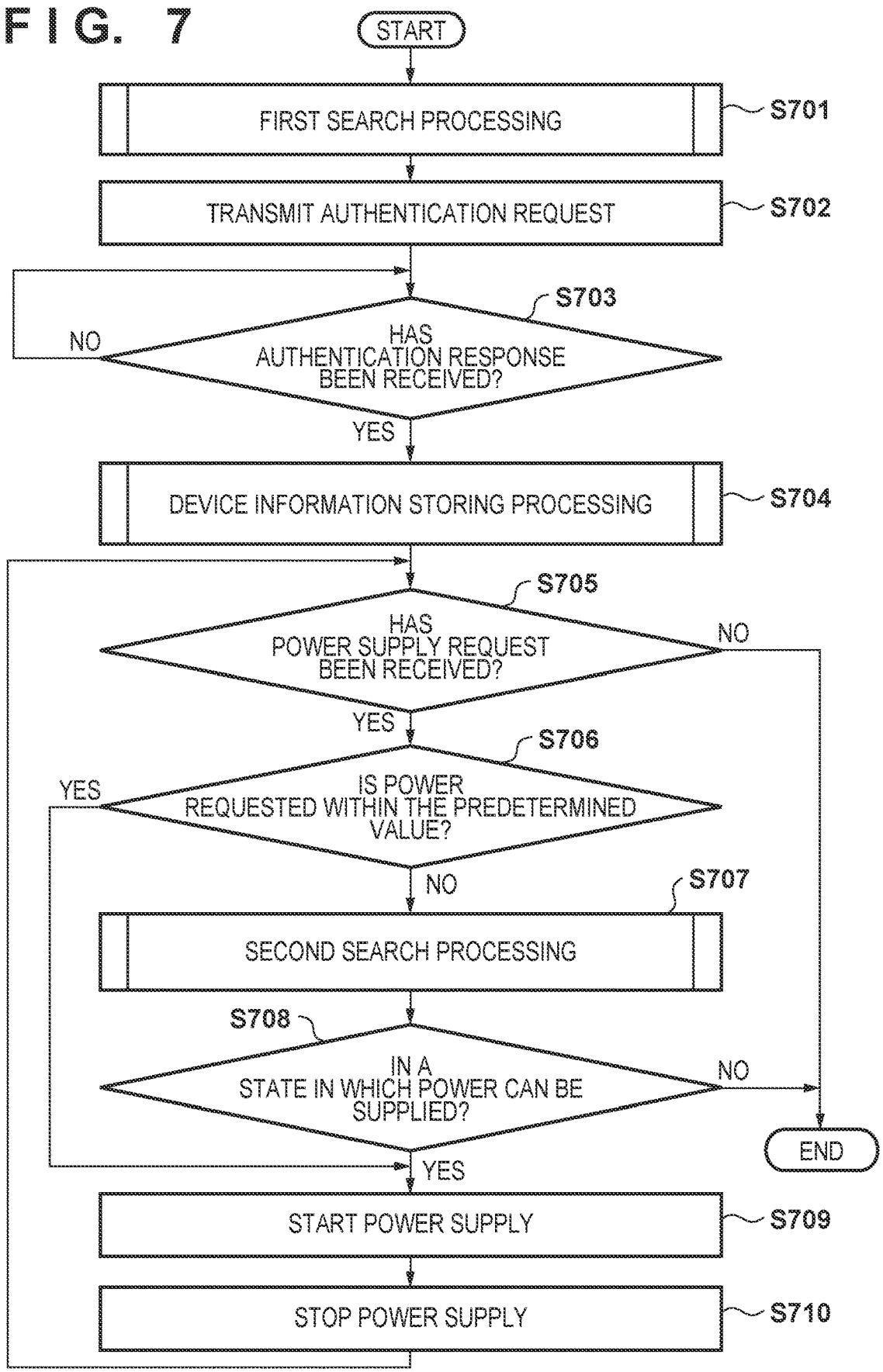
FIG. 7 is a flowchart showing a power supply operation of a second embodiment.

In steps S701 to S704 in FIG. 7, processes similar to those of steps S301 to S304 in FIG. 3 are performed.

In step S705, the CPU 20 determines whether or not a power supply request has been received from the power reception apparatus 30, and if it is determined that a power supply request has been received (YES in step S705), the procedure advances to step S706, and if it is determined that a power supply request has not been received (NO in step S705), the procedure ends.

In step S706, the CPU 20 determines whether or not power corresponding to the power supply request received from the power reception apparatus 30 in step S705 is within a predetermined value. The predetermined value is equivalent to a power value that is transmitted when the power supply apparatus 10 communicates with the power reception apparatus 30. Note that the predetermined value may be changed to any value according to the states of the power supply apparatus 10 and the power reception apparatus 30. If the CPU 20 determines that the power requested from the power reception apparatus 30 is within the predetermined value (YES in step S706), the procedure advances to step S709, and if the CPU 20 determines that the predetermined value has been exceeded (NO in step S706), the procedure advances to step S707.

In steps S707 to S710 in FIG. 7, processes similar to those of steps S306 to S309 in FIG. 3 are performed.

As described above, according to the power supply control of the present embodiment, even if the communication apparatus 40 other than the power reception apparatus 30 is arranged while the power supply apparatus 10 is performing communication processing with the power reception apparatus 30 before power supply is started, control is performed so as not to start power supply. In this manner, by searching for the communication apparatus 40 other than the power reception apparatus 30 during communication processing before power supply is started, it is possible to start power supply to the power reception apparatus 30 so as not to supply power to the communication apparatus 40 other than the power reception apparatus 30.

According to the present invention, before a power reception apparatus is detected and power supply is started, a communication apparatus other than the power reception apparatus is searched for, and thus it is possible to prevent power supply to the communication apparatus other than the power reception apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A power supply apparatus that can supply power to a power reception apparatus in a non-contact manner, comprising:
   a communication unit that is capable of communicating with a power reception apparatus; and
   a control unit that controls power supply to a power reception apparatus,
   wherein the control unit performs control so as to:
      perform first search processing for detecting a power reception apparatus using a first communication method, a second communication method and a third communication method in order,
      perform control so as to establish, after the first search processing, connection with the power reception apparatus detected in the first search processing,
      perform without disconnection from the power reception apparatus, after the connection is established and before performing power supply to the power reception apparatus detected in the first search processing, second search processing for detecting a communication apparatus other than the power reception apparatus using the first communication method, the second communication method and the third communication method in order, wherein the second search processing is started using a communication method that is different from a communication method which has been used in the first search processing in a case where the power reception apparatus is detected, and if a communication apparatus other than the power reception apparatus is not detected in the second search processing, transition to a state where power supply to the power reception apparatus is possible, and if a communication apparatus other than the power reception apparatus is detected in the second search processing, not start power supply to the power reception apparatus;

wherein the first communication method, the second communication method and the third communication method comply with different communication standards respectively and have the same frequency, and the search processing based on each of the communication methods transmits a request command according to its communication method.

2. The power supply apparatus according to claim 1, wherein the control unit determines whether to perform the second search processing if a power supply request is received from the power reception apparatus detected in the first search processing.

3. The power supply apparatus according to claim 2, wherein, if power requested as per the power supply request is within a predetermined value, the control unit performs control so as to not perform the second search processing, and to transition to a state where power supply to the power reception apparatus is possible.

4. The power supply apparatus according to claim 1, wherein the control unit causes the communication unit to acquire identification information of the power reception apparatus and a communication method that the power reception apparatus complies with, from the power reception apparatus detected in the first search processing, and the control unit stores, in a storage unit, the identification information of the power reception apparatus acquired by the communication unit and the communication method that the power reception apparatus complies with, in association with each other.

5. The power supply apparatus according to claim 1, wherein the control unit repeatedly performs the first search processing until a power reception apparatus is detected in the first search processing.

6. The power supply apparatus according to claim 1, wherein the control unit performs control so as to not start power supply to the power reception apparatus if a plurality of devices are detected in the first search processing.

7. The power supply apparatus according to claim 6, further comprising a notification unit that makes a notification of a fact that power supply to the power reception apparatus cannot be started, if the control unit detects a plurality of devices in the first search processing.

8. The power supply apparatus according to claim 1, wherein the control unit performs, in the second search processing, search processing using a communication method that the power reception apparatus detected in the first search processing complies with, after performing search processing using a communication method that the power reception apparatus does not comply with.

9. The power supply apparatus according to claim 8, wherein the control unit performs control so as to perform, in the second search processing, search processing using a communication method that the power reception apparatus detected in the first search processing does not comply with.

10. The power supply apparatus according to claim 9, further comprising a notification unit that makes a notification of the fact that power supply to the power reception apparatus cannot be started, if the control unit detects a communication apparatus other than the power reception apparatus in the second search processing.

11. The power supply apparatus according to claim 9, wherein the control unit performs control so as to perform the second search processing again if power supply to the power reception apparatus is not started, and to transition to a state where power supply to the power reception apparatus is possible if a communication apparatus other than the power reception apparatus is not detected.

12. The power supply apparatus according to claim 11, wherein the control unit performs the second search processing a predetermined number of times or more.

13. The power supply apparatus according to claim 1, wherein the control unit starts power supply without performing authentication processing on the power reception apparatus detected in the first search processing, if a communication apparatus other than the power reception apparatus is not detected in the second search processing.

14. The power supply apparatus according to claim 1, wherein the control unit performs authentication processing on the power reception apparatus detected in the first search processing, and does not perform authentication processing on the power reception apparatus if the power reception apparatus is detected in the second search processing.

15. The power supply apparatus according to claim 1, wherein the first communication method complies with ISO/IEC14443 standard, the second communication method complies with ISO/IEC 15693, and the third communication method complies with ISO/IEC 18092.

16. The power supply apparatus according to claim 1, wherein the communication unit includes a power supply unit that wirelessly transmits power to the power reception apparatus.

17. A control method of a power supply apparatus that includes a communication unit that is capable of communicating with a power reception apparatus and a control unit that controls power supply to a power reception apparatus in a non-contact manner, the method comprising:

performing first search processing for detecting a power reception apparatus using a first communication method, a second communication method and a third communication method in order, performing control so as to establish, after the first search processing, connection with the power reception apparatus detected in the first search processing, after the connection is established and before performing power supply to the power reception apparatus detected in the first search processing, performing without disconnection from the power reception apparatus second search processing for detecting a communication apparatus other than the power reception apparatus using the first communication method, the second communication method and the third communication method in order, wherein the second search processing is started using a communication method that is different from a communication method which has been used in the first search processing in a case where the power reception apparatus is detected, and if a communication apparatus other than the power reception apparatus is not detected in the second search processing, transitioning to a state where power supply to the power reception apparatus is possible, and if a communication apparatus other than the power reception apparatus is detected in the second search processing, not starting power supply to the power reception apparatus;

wherein the first communication method, the second communication method and the third communication method comply with different communication standards respectively and have the same frequency, and the search processing based on each of the communication methods transmits a request command according to its communication method.

18. A non-transitory computer-readable storage medium which stores a program for causing a power supply apparatus that includes a communication unit that is capable of communicating with a power reception apparatus and a control unit that controls power supply to a power reception apparatus in a non-contact manner, the method comprising:

performing first search processing for detecting a power reception apparatus using a first communication method, a second communication method and a third communication method in order, performing control so as to establish, after the first search processing, connection with the power reception apparatus detected in the first search processing, after the connection is established and before performing power supply to the power reception apparatus detected in the first search processing, performing without disconnection from the power reception apparatus second search processing for detecting a communication apparatus other than the power reception apparatus using the first communication method, the second communication method and the third communication method in order, wherein the second search processing is started using a communication method that is different from a communication method which has been used in the first search processing in a case where the power reception apparatus is detected, and if a communication apparatus other than the power reception apparatus is not detected in the second search processing, transitioning to a state where power supply to the power reception apparatus is possible, and if a communication apparatus other than the power reception apparatus is detected in the second search processing, not starting power supply to the power reception apparatus;

wherein the first communication method, the second communication method and the third communication method comply with different communication standards respectively and have the same frequency, and the search processing based on each of the communication methods transmits a request command according to its communication method.

* * * * *